UNITED STATES PATENT OFFICE.

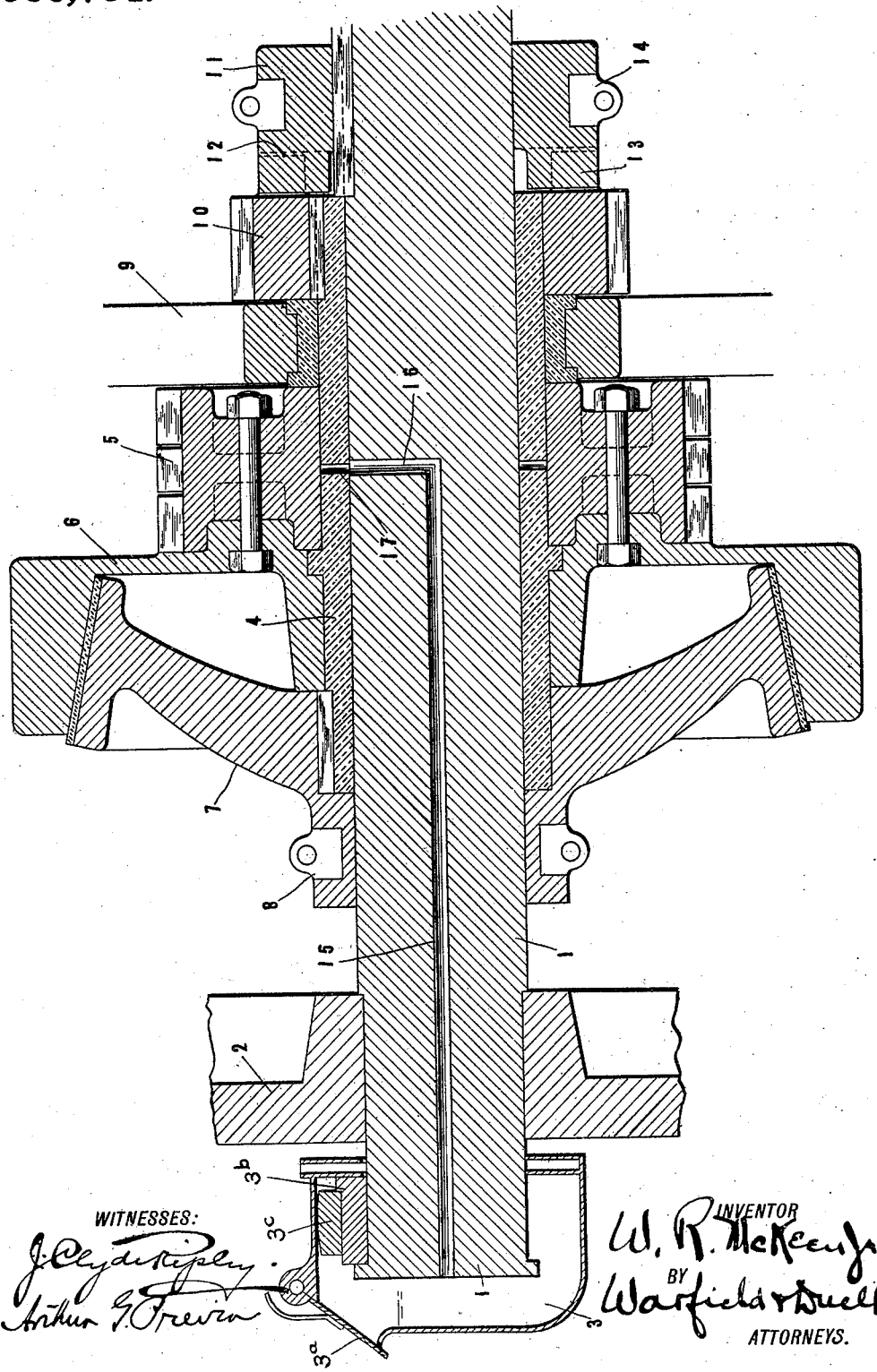

WILLIAM RILEY McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

LUBRICATING APPARATUS.

986,734.	Specification of Letters Patent.	Patented Mar. 14, 1911.

Application filed February 26, 1906. Serial No. 302,912.

*To all whom it may concern:*

Be it known that I, WILLIAM R. McKEEN, Jr., residing at Omaha, in the county of Douglas and State of Nebraska, have invented certain new and useful Improvements in Lubricating Apparatus, of which the following is a full, clear, and exact description, such as will enable others skilled in the art to which it appertains to make and use the same.

This invention relates to lubricating apparatus.

One of the objects thereof is to provide practical and efficient means adapted automatically to convey a lubricant to bearing-surfaces.

Another object is to provide means of the above type especially adapted for use in the lubrication of inaccessible parts.

Another object is to provide lubricating means of simple and compact construction adapted positively to feed a lubricant more freely while the parts are in motion.

Other objects will be in part obvious and in part pointed out hereinafter.

The invention accordingly consists in the features of construction, combinations of elements and arrangement of parts which will be exemplified in the embodiment thereof hereinafter described and the scope of the application of which will be indicated in the following claims.

The accompanying drawing is a sectional elevation of one of various possible embodiments of my invention.

In order to render this invention more readily understood, it may here be noted that in the lubrication of machinery, and especially in the case of heavy machinery, as that to which this invention is peculiarly applicable, it is a feature of paramount importance that the lubricant be fed at a rate such as to avoid all unnecessary friction and yet to do away with waste. It may also be noted at this point that, in order to avoid the considerable expenditure of time and labor incident to the lubrication of a number of inaccessible parts in apparatus of the general nature of that with which this invention deals, it is highly important that means be provided for supplying these bearing-surfaces from a common source. It is also of interest in this connection that, in the case of apparatus used in connection with cars or other vehicles, there is a considerable tendency for dust and other foreign matter to work into the bearings and cut the surfaces thereof. The above and other defects are eliminated and many positive advantages attained in constructions of the nature of that hereinafter described.

Referring now to the accompanying drawing, there is shown a shaft 1 which, in this case, represents the axle of a car or other vehicle. This shaft is provided with wheels, one of which is shown at 2, and a box 3 as shown in the drawings. This box 3 is essentially of the form commonly used in railway cars and is provided with a hinged cover 3$^a$ and the usual brass 3$^b$ and wedge 3$^c$. Any form of box adapted to hold a supply of lubricant and permit it to be properly fed to the bearings might be substituted.

Loosely mounted upon axle 1 is a sleeve 4, upon which is journaled a driving member 5 which in turn may derive power from any desired source. To the driving member 5 is secured a clutch-member 6 adapted to co-act with a clutch-member 7 keyed upon sleeve 4. The form of clutch herein shown is the typical cone friction-clutch, but it is to be understood that a friction-clutch of any desired type may be positioned at this point and that many of the advantageous features of my invention may be realized with a positively acting clutch. The clutch-member 7 is actuated through a loose collar or band 8 from any desired source of power and by any desired means, the latter preferably being mounted upon the frame 9 within which the sleeve 4 rotates.

Keyed upon the end of sleeve 4 is a clutch-member 10 adapted to engage and interlock with a clutch-member 11 keyed upon the axle. This interlocking action is brought about through the teeth 12 and 13, respectively formed on these clutch-members, and the member 11 is thrown in or out in any desired manner through the band or collar 14.

It will thus be seen that under certain conditions the driving member or gear 5 rotates upon the outer surface of sleeve 4 and the latter part may rotate upon the axle 1. These bearing-surfaces are not only more or less inaccessible but, as in the case of the car driving mechanism shown, bear a heavy load. For this and other reasons it is highly important that they be automatically maintained in a well lubricated condition. For the latter purpose, I provide a passage 15 leading longitudinally from the box 3 through the axle 1 to a point substantially opposite the center of the driving member or gear 5. From this point the passage leads radially, as at 16, to the outer surface of the axle, discharging in the bearing between the latter part and the sleeve 4. Adapted to register with the outer end of the passage 16 are a series of discharge-passages 17 leading through the sleeve 4 to the bearing between this part and the gear 5.

The operation of this embodiment of my invention is as follows:—Assume the parts 1, 4 and 5 to be rotating relatively one to another, it being understood that any desired amount of slip may take place between the members of the friction-clutch. The apparatus shown is in large part diagrammatic. The grease or other lubricant is thrown by centrifugal force outwardly through the passages 16 and 17 to the bearings at which these conduits terminate. The rate of feed is, in general, proportional to the rate at which the parts revolve, the same being governed to a large extent by a centrifugal force and thus the supply is, in a measure, proportional to the demand made thereon by the bearing-surfaces. The lubricant is continually fed from the oil reservoir 3 through the conduit 15, either by gravity, or other means, so as to make good the amount discharged through the passage 16 and thus render the action not only automatic but continuous.

It will thus be seen that I have provided means well adapted to accomplish the objects of my invention and that the same are of the most simple and inexpensive construction. The action, moreover, is thoroughly reliable, as not only is all complicated mechanism avoided but the apparatus is so self-contained as to exclude dust and other foreign matter and so automatic as substantially to do away with the need of supervision.

The invention is particularly applicable to structures such as illustrated and described in Patent No. 973,365 granted to me October 18, 1910.

As many changes could be made in the above construction and many apparently widely different embodiments of my invention could be made without departing from the scope thereof, I intend that all matter contained in the above description or shown in the accompanying drawing shall be interpreted as illustrative and not in a limiting sense.

Having described my invention, what I claim as new, and desire to secure by Letters Patent, is:—

1. A lubricating system for vehicles comprising, in combination, an axle, a wheel thereon, a receptacle adapted to retain a lubricant positioned at one end of said axle, a sleeve rotatable on said axle and adapted to be clutched thereto, a driving member rotatably positioned upon said sleeve, a member keyed to said sleeve and adapted to be clutched by said driving member whereby the axle is caused to be driven by said driving member, said axle being provided with a passage leading from said lubricant receptacle longitudinally throughout a portion thereof, thence outwardly toward the bearing surface between said axle and said sleeve, said sleeve being provided with a plurality of passages registering with said first mentioned passage whereby the surface between the driving member and the sleeve is lubricated by the centrifugal action exerted on said lubricant on rotation of the axle.

2. A lubricating system for the transmission mechanism of motor vehicles comprising, in combination, an axle, a wheel thereon, a lubricating receptacle positioned on said axle, a rotatable sleeve loosely mounted on said axle and adapted to be clutched thereto, a driving member loosely mounted on said sleeve, intermediate mechanism for connecting the driving member to said sleeve, said axle being provided with a passage leading from said lubricant receptacle to the surface between said rotatable sleeve and said axle, said sleeve being provided with a plurality of passages registering with said first mentioned passage on rotation of the sleeve, whereby the lubricant is conveyed to the bearing surface between said sleeve and said driving member.

In testimony whereof I affix my signature, in the presence of two witnesses.

WILLIAM RILEY McKEEN, Jr.

Witnesses:
CHAS. L. DUNDEY,
FRANCIS J. MIEDING.